No. 707,777. Patented Aug. 26, 1902.
G. J. HICKS.
CHOCOLATE COATING OR DIPPING MACHINE.
(Application filed Dec. 14, 1899.)
(No Model.) 6 Sheets—Sheet 1.

No. 707,777. Patented Aug. 26, 1902.
G. J. HICKS.
CHOCOLATE COATING OR DIPPING MACHINE.
(Application filed Dec. 14, 1899.)
(No Model.)
6 Sheets—Sheet 3.

Fig. 1.

No. 707,777. Patented Aug. 26, 1902.
G. J. HICKS.
CHOCOLATE COATING OR DIPPING MACHINE.
(Application filed Dec. 14, 1899.)
(No Model.) 6 Sheets—Sheet 5.

No. 707,777. Patented Aug. 26, 1902.
G. J. HICKS.
CHOCOLATE COATING OR DIPPING MACHINE.
(Application filed Dec. 1, 1899.)
(No Model.) 6 Sheets—Sheet 6.

UNITED STATES PATENT OFFICE.

GEORGE J. HICKS, OF NEW YORK, N. Y.

CHOCOLATE COATING OR DIPPING MACHINE.

SPECIFICATION forming part of Letters Patent No. 707,777, dated August 26, 1902.

Application filed December 14, 1899. Serial No. 740,243. (No model.)

*To all whom it may concern:*

Be it known that I, GEORGE J. HICKS, a citizen of the United States, and a resident of the borough of Manhattan, in the city, county, and State of New York, have invented certain new and useful Improvements in Chocolate Coating or Dipping Machines, of which the following is a specification, reference being had to the accompanying drawings, forming part thereof.

My invention relates to improvements in that class of machines adapted for coating cream-drops or other confections with chocolate or other coating substance by dipping the same into the liquid chocolate or other coating substance and then carrying the coated drops to a convenient position to be removed from the machine either automatically or by hand, the principal object of my invention being to improve such class of machines, whereby the capacity of the same for handling and coating quantities of confections may be very largely increased and at the same time otherwise render the machines more effective and desirable for the purpose intended.

In carrying my invention into effect I provide a machine comprising a suitable receptacle for containing the chocolate or other coating substance, two endless chains or carriers provided with a series of holders for containing the confections or drops to be coated and adapted to operate over suitable driving and guiding wheels to carry the said holders successively to a position to receive the drops, then through the coating substance whereby the supported drops are coated, and then to a position to automatically discharge the coated drops, an endless apron for receiving the drops when discharged from the machine and carrying the same to a convenient position to be removed by an attendant, means for communicating a shaking or jarring movement to the holders after leaving the chocolate-receptacle and while still in a position above the latter, so as to cause the removal of any superfluous coating substance from the drops and their holders, and means for insuring the automatic discharge of the coated drops from the holders in the proper place and position.

My invention also embodies other novel features of construction and combinations of parts, all as hereinafter set forth in detail, and pointed out in the claims.

Referring to the drawings.

To explain in detail, the main supporting-frame, upon which the several parts of the machine are either directly or indirectly supported, consists, as shown, of two vertically-arranged side frames or castings 1 1, which are rigidly united with a space between the same by a number of connecting cross rods or braces 2. Within the space between the said side frames 1 1 and upon a cross-brace 3 is securely fastened the receptacle 4 for containing the chocolate or other coating substance. A water-jacket 5 surrounds the receptacle 4, the same being adapted to receive hot water for the purpose of heating the contents of said receptacle and keeping the same in its liquid form, the water in said jacket being kept heated by means of a steam-pipe coil 6, passing through the same in the usual manner.

Figure 7:
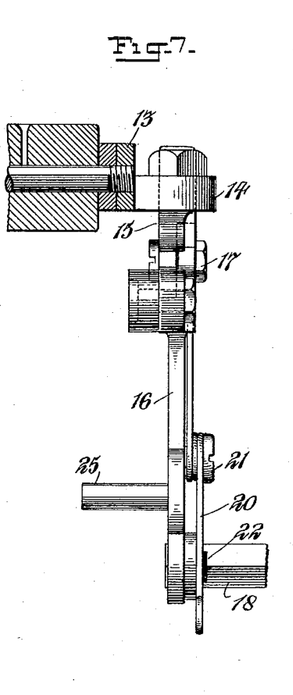
Fig. 7 is an edge or end elevation of the construction shown in Fig. 6 with a portion of the chain in section.

A series of shafts or studs (indicated at 7, 8, 9, 10, 11, and 12) are supported in suitable bearings in each of the opposite side frames 1 1 and each provided with a sprocket-wheel, (indicated at 7', 8', 9', 10', 11', and 12', respectively,) supported thereon. Two endless chains 13 13, to which the confection-holders are attached, are driven and guided by the said sprocket-wheels to carry the attached holders successively to the several different desired positions, as will hereinafter be described. As shown in the drawings, each alternate link of the chains 13 13 is provided with a laterally-projecting flange or ear 14, to which is rigidly secured the shank 15 of a bracket-arm 16, the latter being pivotally connected at one end with its said supporting-shank at 17, as more clearly shown in Figs. 6 and 7. These bracket-arms 16 on each chain are arranged opposite and parallel with those of the other chain, so as to form a series of successively-arranged pairs of arms, each pair being provided with openings 17 adjacent to their free ends which are adapted to receive the ends of a bar 18, forming part of the confection-holding attachment, and so support and carry the latter in position between said arms, as more clearly shown in Fig. 4. The said bar 18 is provided with a number of open wire cups 19, secured thereon, for receiving and supporting the drops or confections to be coated, and forms, in connection with said cups, what I term the "confection-holding" attachment. These attachments during the operation of the machine are passed through the chocolate or other coating substance and become more or less coated with the latter. It is therefore desirable that the same should be readily and conveniently detachable from the machine for the purpose of being cleaned, and as a simple means for supporting them in detachable connection with their supporting-bracket arms the opening 17 in the latter are made square to loosely receive the correspondingly-formed ends of the bar 18 and hold the latter from turning relative to the bracket-arms, while a snap-spring 20, secured upon said arms by a screw 21, engages with the bar 18 within a notch 22 therein and holds the same longitudinally in position within the said openings in the bracket-arms. To remove one of the holder attachments, the attendant grasps the lower end of the spring 20 and moves it outward from the notch in the bar 18, then moves the latter longitudinally until one end is free from its seat or opening in one of the bracket-arms, and then swings the latter back from its position opposite the end of the bar 18 to permit the latter being withdrawn from the seat or opening 17 in the opposite arm. In this way the holder attachments may be quickly removed from the machine by the ordinary attendant and be as readily replaced.

The bracket-arms 16, as before described, have a pivotal connection with their supporting-shanks 15, so as to have a loose swinging movement independent of the chain. This movement is desirable so that a shaking or jarring movement may be communicated to the same and the supported confection-holders after leaving the chocolate or other coating substance for the purpose of causing the removal of any superfluous chocolate from both the drops and holders and also to permit a second jarring movement at the proper point for the purpose of loosening the coated drops in their holders and insuring their discharge from the latter, as well as to permit their movement, as before described, in connecting or disconnecting the holder attachments. Such swinging movement of the arms, however, is limited by two laterally-projecting extensions 23 23 on said arms engaging with two other extensions 24 24 on the supporting-shank 15. These engaging arms or extensions are so arranged as to permit a desired amount of swing to the arms, but at the same time so limit their movement as to prevent any undue contact of the holders with one another.

Figure 3:
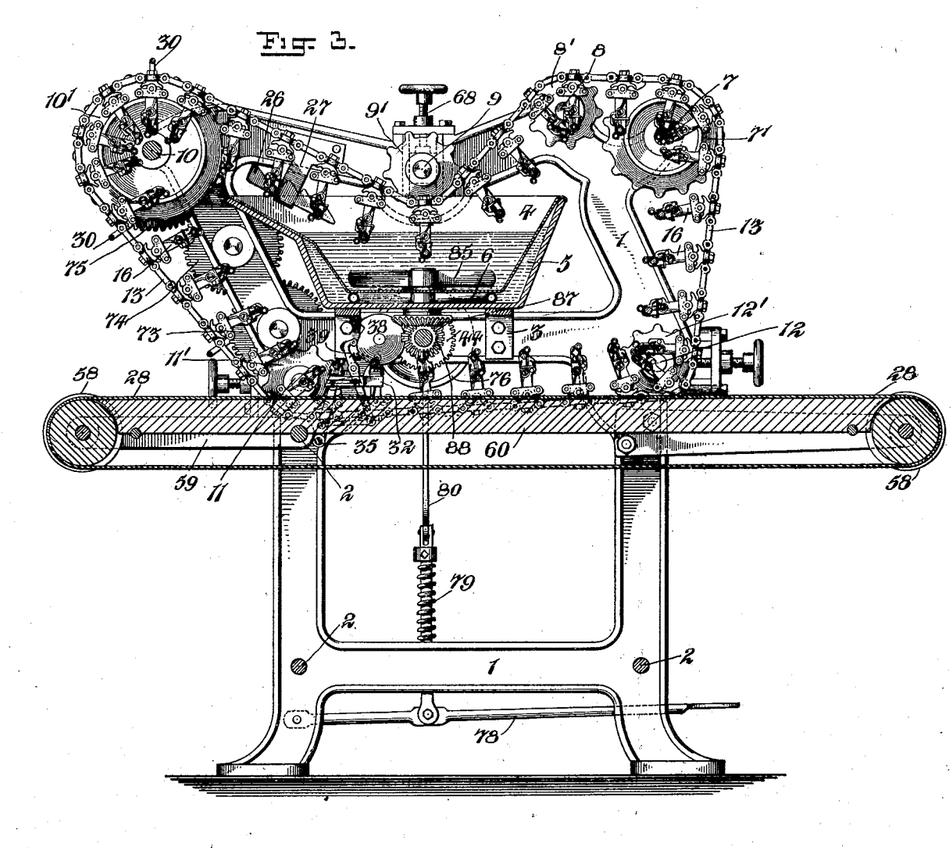
Fig. 3 is a vertical section taken longitudinally through the center of the machine with certain of the parts for retaining the confections in their holders broken away.
Figures 9, 10:
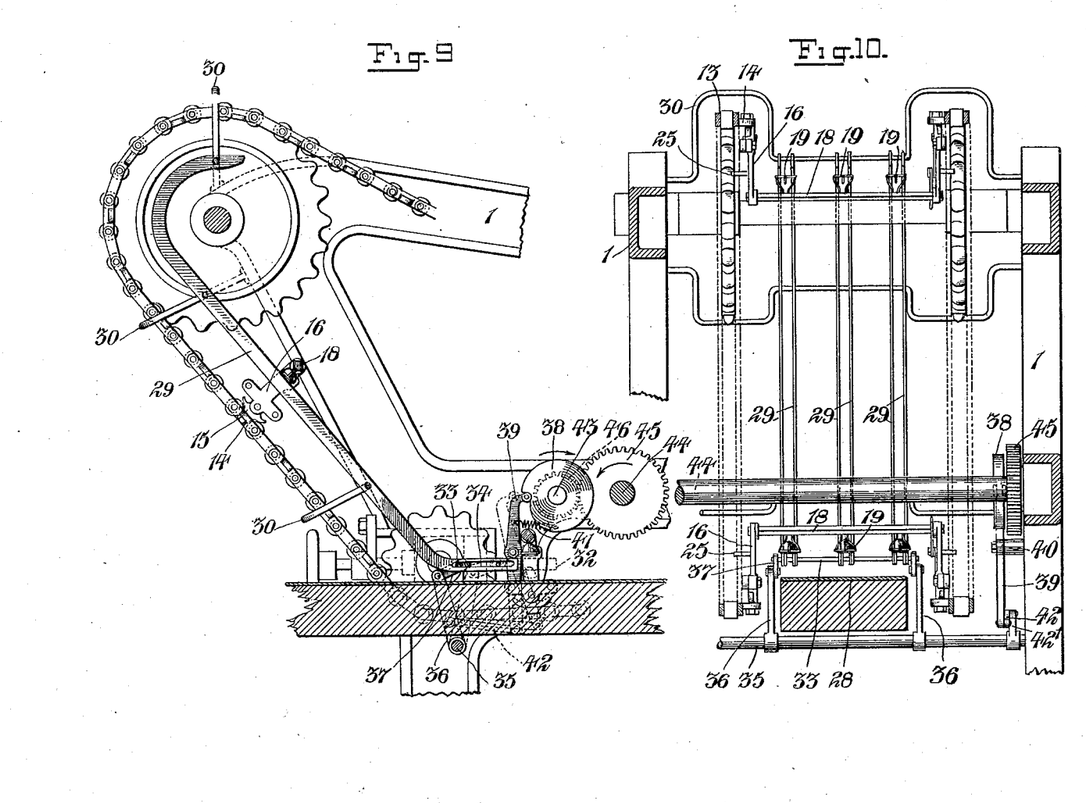
Fig. 9 is an enlarged detail view of a portion of the machine, illustrating the means for retaining the confections in their holders during a portion of the path of movement of the latter and for insuring their being deposited on the receiving-apron in an upright position or with their base resting on the latter.
Fig. 10 is an end view of the construction shown in Fig. 9 looking toward the left.

In the operation of the machine the chains 13 move from the wheels 7' at the front end of the machine to the adjacent wheels 8' in a substantially horizontal path and with the supported confection-holding cups 19 in an upright position, as clearly shown in Fig. 3, whereby the attendant may conveniently feed the machine at such point or adjacent thereto by placing the drops to be coated in said cups as the successive rows of the latter are brought to the proper position. From the wheels 8' the chains move down beneath the guide-wheels 9', located above the chocolate-containing receptacle 4, so as to cause the holder attachments, with the supported drops or confections, to enter and pass through the chocolate or other coating substance, as clearly shown in Figs. 3 and 4, and then again move upward at an incline in passing over the wheels 10' at the rear end of the machine, so as to carry the holders upward and out of the coating substance. After the holders have been carried out of the coating substance, but while still in a position above the receptacle 4, they are subjected to a shaking or jarring movement, so as to cause the removal of any superfluous coating substance remaining either on the drops or holders by reason of a laterally-projecting pin 25, located on each of the opposite bracket-arms 16, engaging with and riding over the toothed or roughened edge of two oppositely-located plates 26 26, arranged in the path of the same, said plates being rigidly supported in position by bracket-arms 27, which are bolted to the opposite sides of the frame. Any suitable means, however, for thus causing the removal of the superfluous coating substance from the holders and drops other than shown and described may be employed without departure from my invention. For instance, the toothed plates 26 instead of being supported in a stationary position, as shown, might be operated by suitable mechanism to receive a vibrating movement back and forth beneath the engaging pins 25 of the bracket-arms, and so communicate a greater or more violent jarring movement to the latter than by the construction shown. After the confection-holders have been subjected to the shaking or jarring motion, as described, they are then carried to a position to deposit the coated drops or confections onto a horizontally-arranged endless apron 28 by the passage of the carrier-chains from the wheels 10' downward to the lower wheels 11' at the rear of the frame and from the latter to the lower wheels 12' at the front end of the machine in a path above and substantially parallel with the said apron 28, the entire movement of the holders as thus described being in a path extending around and into the chocolate-containing receptacle 4. The position of the confection-holding cups 19 during the passage of the chains from the wheels 10' to a point where the drops are deposited onto the endless apron is gradually changed or reversed from an upright position to a downwardly-hanging position, as shown in Fig. 3. It is therefore necessary that a suitable means be provided for retaining the coated drops or confections within their holders during such portion of the path of movement of the latter, and as a simple and effective means for such purpose I have located one or more narrow strips or plates 29 immediately opposite and adjacent to the path of each cup 19 and extending from a point about central above the shaft 10 and where the cups begin to change from their upright position to a point above the apron 28 where the drops are to be discharged from the cups, as more clearly shown in Fig. 9. These strips or plates 29 are preferably made quite narrow, so as to present as little surface as possible for contact with the coated drops, in order to prevent the removal of any undue quantity of the coating substance from the drops by their contact with the said strips. The latter are supported in position by cross-rods 30, which extend through transverse openings in the same and are bolted or otherwise secured at their ends upon the opposite sides of the frame. In the present instance illustrated the cups 19 are constructed to receive a cream-drop of the usual conoidal form with the base or bottom upward, as indicated by dotted lines in Fig. 8. Thus when the cups are brought opposite the plates 29 and tilted downward the supported drops or confections drop against said plates and are carried with their bottom or base resting against the latter, as shown in Fig. 9. When the drops reach the ends of the plates 29 and in position to be deposited upon the apron 28, it is necessary that they should drop upon the latter base downward or in an upright position. To accomplish this, I have supported a so-called "finger" 32 (consisting of a narrow plate or wire) adjacent to the ends of the plates 29 with one end projecting beyond the latter a distance about the width of a drop and in position about central beneath the cups 19. (See Figs. 3, 4, 9, and 10.) These fingers are operated to have a reciprocating movement and timed in their operation so as to remain stationary while a drop is being moved onto the same, then have a very quick backward movement from beneath the supported drop, so as to insure the latter being dropped or deposited in an upright position on the endless apron 28, and then moved forward again to its normal position to receive the drops from the succeeding cups. Any suitable means may be employed for communicating such reciprocating movement to the fingers without departure from my invention, the means as herein shown being as follows: A bar 33, to which the fingers 32 are rigidly attached, extends transversely through elongated slots 34 in the lower horizontal ends of the plates 29, as shown in Figs. 3, 9, and 10, so as to be capable of sliding back and forth therein. A rock-shaft 35, supported in suitable bearings in the opposite frames 1 1, is provided with two rigidly-attached arms 36 36, which are connected at their ends through the medium of links 37 37 with the opposite ends of the finger-carrying bar 33. This rock-shaft is operated from a rotating cam 38 to communicate the desired reciprocating movement to the fingers 32, as described, through the medium of a lever 39, which is pivotally supported at 40 (see Fig. 10) upon the frame with one end held in operative contact with said cam by a spring 41 and its opposite end connected with one of the arms 36 of the rock-shaft through the medium of a link 42. Thus when the lever rides upon the concentric portion of said cam and is in the position indicated by dotted lines in Fig. 9 the fingers are in their forwardly-extended position, as shown; but as the cut-away portion of the cam comes opposite the lever the latter is thrown forward and into the same with a quick movement under the action of the spring in the position indicated by full lines in said Fig. 9 and causes the extended fingers to be withdrawn backwardly from beneath the supported drops. The operating-cam 38 is secured on a short shaft 43, supported at one side of the frame, which shaft is driven from the main driving-shaft 44 through the medium of gears 45 and 46.

Figure 1:
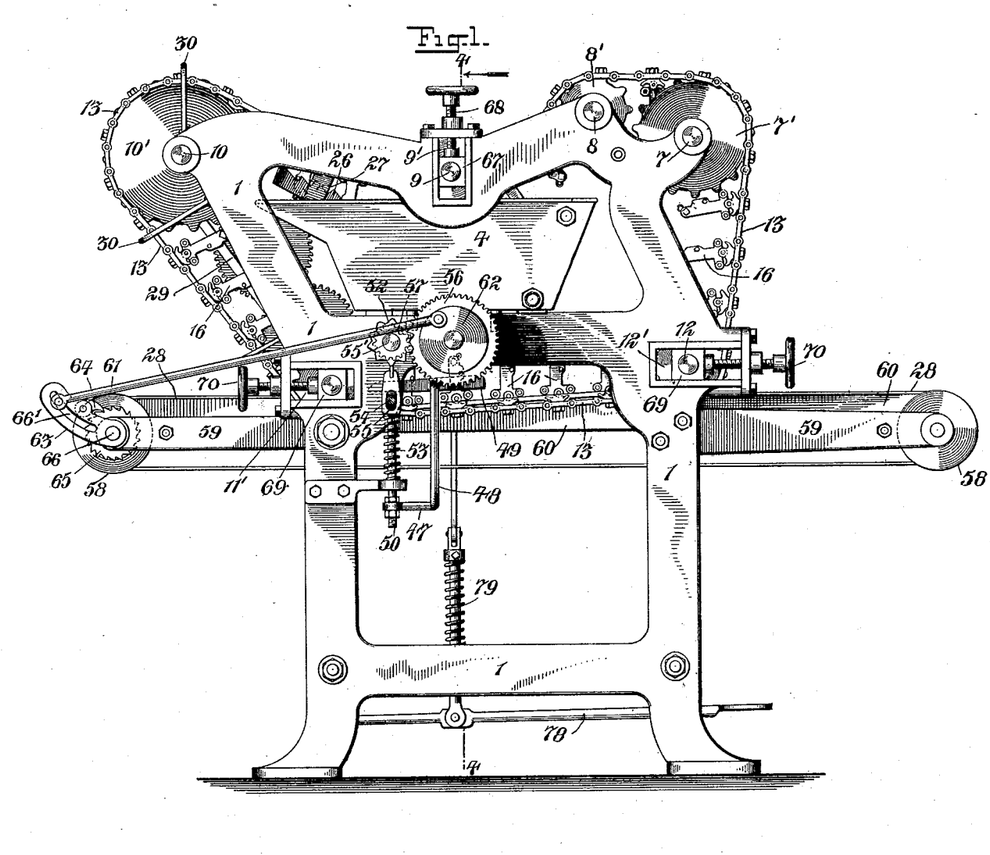
Figure 1 is a side elevation of a machine embodying my invention.
Figure 4:
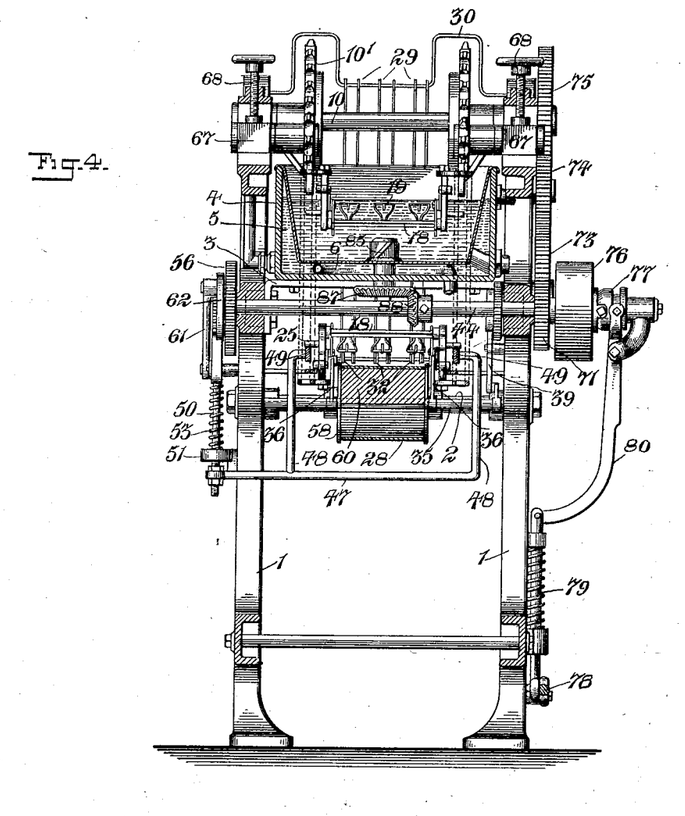
Fig. 4 is a vertical cross-section taken through line 4 4 of Fig. 1.

In order to insure the coated drops being loose in the cups 19 and ready to drop from the latter when they reach a position above the fingers 32 and the latter are withdrawn from beneath the same, as described, I have provided a vertically-reciprocating frame 47, as more clearly shown in Figs. 1 and 4, having two arms 48 48, each of which is provided with a horizontally-arranged plate 49, supported at one end thereof and adapted to receive the fingers 25 of the bracket-arm 16 on its upper edge or surface and communicate a shaking or jarring movement to the same and the supported holders, the position and length of said plates being such that the fingers of a pair of bracket-arms pass onto one end of the same before the drops in the holders carried by said arms reach the fingers 32 and continue on said plates until after the holder has moved beyond said fingers. In this way if the drops are slightly stuck in their holders, by reason of the setting or hardening of the coating substance, such jarring movement of the holders positively insures the loosening of the same prior to the time of their reaching a position to be discharged. As herein shown, the frame 47 is rigidly attached to a vertically-arranged rod 50, which is supported in a bracket 51 at one side of the machine, (see Figs. 1 and 4,) with its upper end yieldingly held in contact with a rotary starwheel 52 by means of a spring 53, bearing with an upward pressure against the same, said rod being supported and guided at its upper end by means of a fixed pin 54 on the frame, extending into an elongated slot 55 therein, as shown. Rotation of the starwheel 52, which is carried on a short shaft or stud 55' and driven from the main driving-shaft 44 through the medium of gears 56 and 57, acts upon the spring-pressed rod 50 and communicates a quick reciprocating or shaking movement to the same and the attached frame 47, with its parts, as will be understood.

The endless apron 28, upon which the coated drops are deposited, operates over two drums or pulleys 58 58, supported by arms 59 59 at the opposite ends of the machine. Intermediate of said drums is a long table 60, over which the apron passes and is supported to afford a firm support to the drops received and carried thereon. The said apron is driven with an intermittent stopping movement, so as to be stationary at a time when the coated drops are being deposited thereon, and then moved forward to carry the deposited drops from beneath the delivery-point of the holders, such stopping and starting movement being continued as each successive row of drops is deposited thereon, the said drops being removed from the apron at the front end of the machine by an attendant. Any suitable means may be employed for communicating the said reciprocating movement to the apron 28, the same being operated, as herein shown, from the main driving-shaft 44 through the medium of a pitman 61, connecting at one end with a crank-disk 62 on said driving-shaft and at its opposite end with a pivotally-supported lever 63, which latter is provided with a pawl 64, engaging with a ratchet-wheel 65, secured on the shaft 66, which carries one of the drums 58, as clearly shown in Fig. 1. By this connection rotation of the crank-disk 62 communicates a vibrating movement to the lever 63, and thereby causes the pawl 64 on the latter to give the ratchet-wheel 65 and connected drum a partial turn at each vibration of said lever. In order that the distance of each successive movement of the apron 28 may be varied to accord with the movement of the confection-holders, I have provided the lever 63 with an elongated slot 66' for the adjustable connection therewith of the pitman 61, whereby the length of vibrations of said lever, and accordingly the movement of the drum operated thereby, may be varied as desired.

In order that the confection-holders may be adjusted to enter the chocolate-containing receptacle 4 a greater or less distance, according to the amount of chocolate or other coating substance contained therein, the shafts 9, which carry the sprocket-wheels 9', under which the chains 13 are guided to enter the holders into the coating substance, are each mounted in a vertically-adjustable block 67, supported in an elongated opening in the opposite sides of the frame, which blocks are each connected with an adjusting-screw 68, supported in the frame, by which they are either raised or lowered and held in adjusted position. To give or take up any slack in the chains necessitated by the adjustment of the wheels 9', I have also supported the shafts carrying the lower wheels 11' and 12' in horizontally-adjustable blocks 69, which latter are also connected with and controlled by adjusting-screws 70 in the same manner as above described relative to the block 67.

Figure 2:
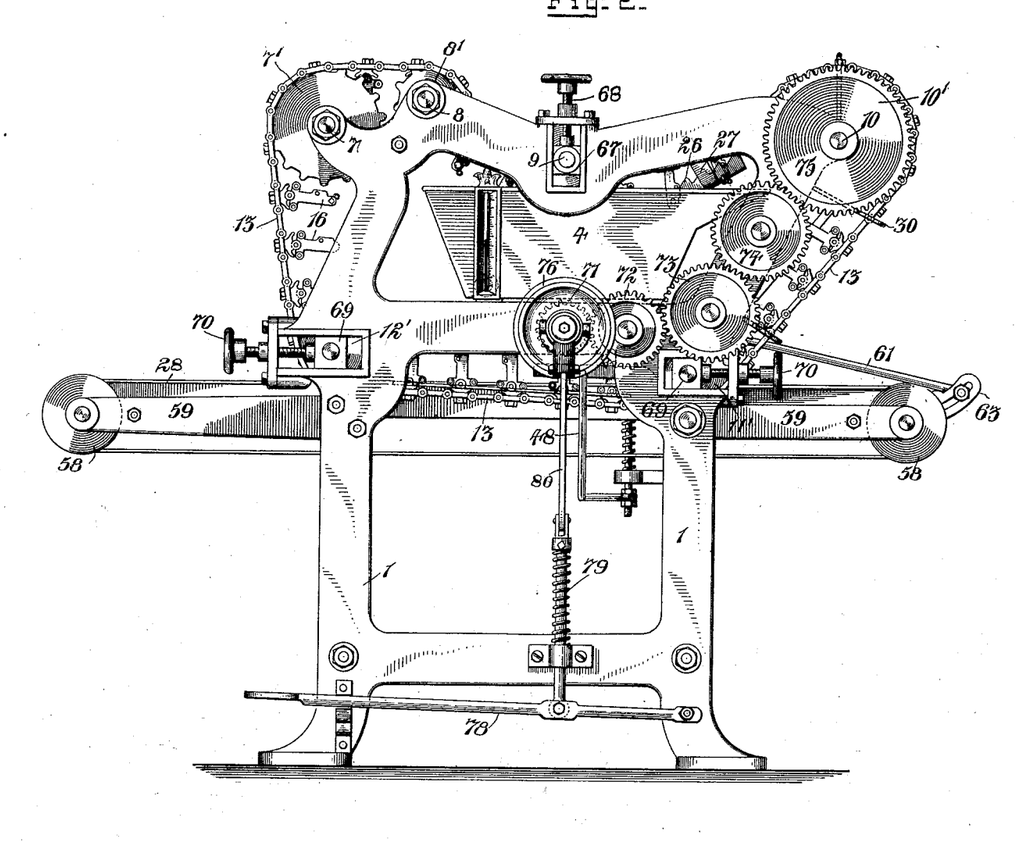
Fig. 2 is an elevation of the machine on the side opposite that shown in Fig. 1.

The chains 13 13 are driven by the sprocket-wheels 10' 10', the latter being both mounted on a single cross-shaft instead of on separate short shafts or studs, as in the case of the other wheels, which shaft is operated from the main driving-shaft 44 through the train of gearing 71, 72, 73, 74, and 75, as more clearly shown in Figs. 2 and 4. Upon the said driving-shaft is mounted a loose belt or driving-pulley 76, which is adapted to be locked with said shaft by means of a sliding clutch 77, which latter may be operated by a foot-treadle 78 through the medium of the connections 79 and 80 in the usual manner.

Figures 5, 6, 8:
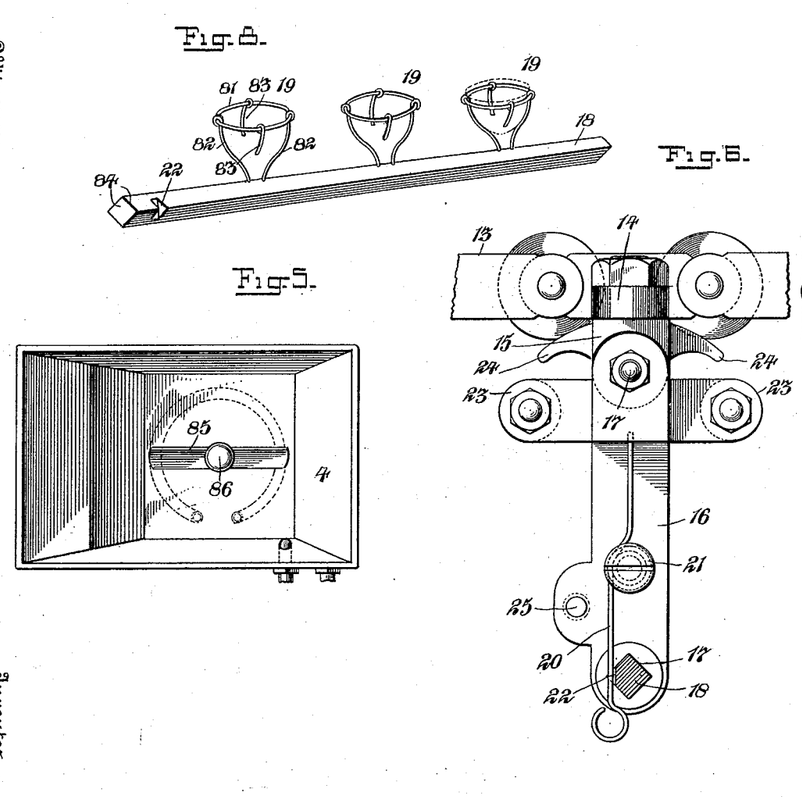
Fig. 5 is a detached plan view of the chocolate-containing receptacle.
Fig. 6 is an enlarged detached side elevation of one of the bracket-arms for supporting the drop or confection-holding attachments, the same being shown in connection with a section of its carrier-chain and having a portion of one of the confection-holder attachments connected therewith.
Fig. 8 is an enlarged detached perspective view of one of the confection-holder attachments and showing a confection, indicated by dotted lines, in position in one of the cups with which the attachment is provided.

The cups 19 for holding the drops or confections to be coated consists, as more clearly shown in Fig. 8, of a round wire ring 81, forming the top or mouth of the cup, and two wires 82 82, connecting at one end with the opposite sides of the said ring to support the same, their opposite or lower ends being entered and supported within openings in the rod 18 at a point slightly distant from each other. These wires 82 82 form two sides of the cup and are each formed with a curve to conform to the sides of the drop to be supported therein, as shown. Two additional wires 83 83 are connected with the ring 81 to form the other two sides of the cup; but these wires are only sufficiently long to engage with the sides of the drop to retain the same in lateral position upon the wires 82 82. By this construction of the cup there is nothing to hold or retain any of the coating substance when lifted from the latter, and the upper surface of the rod 18 being formed with oppositely-sloping surfaces 84 84 the coating substance also readily runs off the latter. The construction of the cup whereby the drop is loosely engaged therein only at several points upon its sides is also important in that it enables the drop to be completely covered by the coating substance when dipped therein. It will be understood, of course, that the form of the cups may be varied as desired, according to the form of the drop or confection to be coated.

One of the important features of my improved machine consists in the continuous operation of the same. In other words, the arrangement of the cups being such that they may be fed or filled by an attendant while being moved and the drops then carried through the coating substance and subsequently automatically deposited without requiring any stopping of the machine renders the latter capable of coating large quantities of confections very rapidly. Furthermore, the scope of the machine may also be increased to almost any desired extent simply by increasing the number of cups on each rod 18.

The chocolate or other coating substance in the receptacle 4 is kept stirred by a revolving blade 85 in the latter, which blade is mounted on a shaft 86, which extends through the bottom of the receptacle and is provided with a gear 87 thereon, meshing with a gear 88 on the main driving-shaft, (see Fig. 4,) from which latter it is operated.

Having thus set forth a practical embodiment of my invention, I do not wish to be understood as limiting myself to the details of construction shown and described, as the invention may be more or less materially modified within the scope of the same as claimed.

What I claim as my invention, and desire to secure by Letters Patent, is—

1. In a machine of the character described, the combination, with a receptacle for containing the coating substance, of an endless chain or carrier provided with a confection-holder, means for operating said chain or carrier with a continuous movement and guiding the same to pass the confection-holder through the coating substance in said receptacle, and means independent of the holder for retaining the confection in said holder and permitting its discharge from the latter at a certain predetermined point.

2. In a machine of the character described, the combination, with a receptacle for containing the coating substance, of an endless chain or carrier provided with a pivotally-supported holder for supporting the confection to be coated, and means for operating said chain or carrier and guiding the same to pass the confection-holder through the coating substance in said receptacle, for the purpose set forth.

3. In a machine of the character described, the combination, with a receptacle for containing the coating substance, of an endless chain or carrier provided with a detachably-connected confection-holder, and means for operating said chain or carrier and guiding the same to pass the connected confection-holder through the coating substance in said receptacle for the purpose set forth.

4. In a machine of the character described, the combination, with a receptacle for containing the coating substance, of an endless chain or carrier provided with a confection-holder, a support for receiving the coated confections, means for operating said chain or carrier with a continuous movement and guiding the same to pass the confection-holder through the coating substance in said receptacle and then to a position adjacent to said support, and means, independent of the holder, for retaining the confections therein after being coated and subsequently permitting their discharge upon said support at a predetermined point.

5. In a machine of the character described, the combination, with a receptacle for containing the coating substance, of an endless chain or carrier provided with a confection-holder, an endless apron for receiving the coated confections, means for operating said chain or carrier with a continuous movement and guiding the same to pass the confection-holder through the coating substance in said receptacle and then to a position adjacent to said endless apron, means independent of the holder for retaining the confections therein after being coated and subsequently permitting their discharge upon said apron, and means for moving said apron with an intermittent movement, for the purpose set forth.

6. In a machine of the character described, the combination, with a receptacle for containing the coating substance, of an endless chain or carrier provided with a confection-holder, a support for receiving the coated confections, means for operating said chain or carrier and guiding the same to pass the confection-holder through the coating substance in said receptacle and then to a position above said support, and means for communicating a shaking or jarring movement to the holder for the purpose of loosening the coated confection therein.

7. In a machine of the character described, the combination, with a receptacle for containing the coating substance, of an endless chain or carrier provided with a confection-holder, a support for receiving the coated confections, means for operating said chain or carrier and guiding the same to pass the confection-holder through the coating substance and then to a position above said support, plates located adjacent to a portion of the path of movement of said holder for holding the confections therein, and a reciprocating plate or finger operating at the terminal end of said retaining-plates, for the purpose set forth.

8. In a machine of the character described, the combination, with a receptacle for containing the coating substance, of an endless chain or carrier provided with confection-holders, a support for receiving the coated confections, means for operating said chain or carrier and guiding the same to pass the confection-holders through the coating substance and to a position above said support, means for subjecting said holders to a shaking or jarring movement above the said receptacle, and means for subjecting said holders to a second shaking or jarring movement above the said support, for the purpose set forth.

9. In a machine of the character described, the combination, with a receptacle for containing the coating substance, of an endless chain or carrier provided with confection-holders, means for operating said chain or carrier and guiding the same to pass the confection-holders through the coating substance in said receptacle, and means for vertically adjusting the path of movement of the holders relative to said receptacle and regulating the slack of the chain or carrier, for the purpose set forth.

10. In a machine of the character described, the combination, with a receptacle for containing the coating substance, of two endless chains or carriers moving in a path parallel with each other, and each being provided with a series of bracket-arms, confection-holders supported by and between said bracket-arms of the opposite carriers, and means for operating said carriers and guiding the same to pass the confection-holders through the coating substance in said receptacle, for the purpose set forth.

11. In a machine of the character described, the combination, with a receptacle for containing the coating substance, of two endless chains or carriers moving in a path parallel with each other, each being provided with a series of pivotally-supported bracket-arms, confection-holders removably supported by and between said bracket-arms of the opposite carriers, a support for receiving the coated confections, and means for operating said carriers with a continuous movement and guiding the same to pass the confection-holders through the coating substance in said receptacle and then to a position to deposit the coated confections upon the said support.

12. A confection-holder, comprising a supporting-bar having two upper oppositely-sloping surfaces, and an open-sided cup located upon the upper side of said bar.

13. A confection-holder, comprising a supporting-bar having two upper oppositely-sloping surfaces, and an open-sided cup located upon the upper side of said bar, the said cup being composed of a ring and two side pieces connecting at one end with said ring and at their opposite end connected with said bar at a point distant from each other.

GEORGE J. HICKS.

Witnesses:
CHAS. F. DANE,
C. G. MACY.